(12) United States Patent
Zhou et al.

(10) Patent No.: US 9,742,028 B2
(45) Date of Patent: Aug. 22, 2017

(54) FLEXIBLE MEMBRANES AND COATED ELECTRODES FOR LITHIUM BASED BATTERIES

(71) Applicant: GM Global Technology Operations LLC, Detroit, MI (US)

(72) Inventors: Weidong Zhou, Warren, MI (US); Xingcheng Xiao, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 14/451,346

(22) Filed: Aug. 4, 2014

(65) Prior Publication Data

US 2015/0056517 A1 Feb. 26, 2015

Related U.S. Application Data

(60) Provisional application No. 61/868,323, filed on Aug. 21, 2013.

(51) Int. Cl.

| | |
|---|---|
| *H01M 10/0562* | (2010.01) |
| *H01M 6/18* | (2006.01) |
| *H01M 2/16* | (2006.01) |
| *H01M 4/131* | (2010.01) |
| *H01M 4/136* | (2010.01) |
| *H01M 4/485* | (2010.01) |

(Continued)

(52) U.S. Cl.
CPC ..... *H01M 10/0562* (2013.01); *H01M 2/1673* (2013.01); *H01M 4/0402* (2013.01); *H01M 4/131* (2013.01); *H01M 4/136* (2013.01); *H01M 4/1391* (2013.01); *H01M 4/366* (2013.01); *H01M 4/485* (2013.01); *H01M 4/5815* (2013.01); *H01M 10/0525* (2013.01); *H01M 10/0565* (2013.01); *H01M 2004/027* (2013.01); *H01M 2004/028* (2013.01); *H01M 2300/0071* (2013.01); *H01M 2300/0082* (2013.01)

(58) Field of Classification Search
CPC .......... H01M 2300/0082; H01M 2/14; H01M 4/136; H01M 6/181; H01M 2/16; H01M 6/185; H01M 6/188
See application file for complete search history.

(56) References Cited

U.S. PATENT DOCUMENTS

| | | | |
|---|---|---|---|
| 9,093,710 B2 * | 7/2015 | Kourtakis | ............ H01M 4/622 |
| 2004/0072066 A1 | 4/2004 | Cho et al. | |

FOREIGN PATENT DOCUMENTS

| | | |
|---|---|---|
| CN | 1489229 | 4/2004 |
| CN | 101385164 | 3/2009 |

(Continued)

*Primary Examiner* — Patrick Ryan
*Assistant Examiner* — Julian Anthony
(74) *Attorney, Agent, or Firm* — Harness, Dickey & Pierce, P.L.C.

(57) ABSTRACT

An example of a flexible membrane includes a porous membrane and a solid electrolyte coating formed on at least a portion of a surface of the porous membrane, in pores of the porous membrane, or both on the surface and in the pores. The solid electrolyte coating includes i) a polymer chain or ii) an inorganic ionically conductive material. The polymer chain or the inorganic material includes a group to interact or react with a polysulfide through covalent bonding or supramolecular interaction.

9 Claims, 5 Drawing Sheets (51) Int. Cl.
*H01M 4/58* (2010.01)
*H01M 10/0565* (2010.01)
*H01M 4/1391* (2010.01)
*H01M 4/04* (2006.01)
*H01M 4/36* (2006.01)
*H01M 10/0525* (2010.01)
*H01M 4/02* (2006.01)

(56) References Cited

FOREIGN PATENT DOCUMENTS

| | | | | |
|---|---|---|---|---|
| JP | 9-134739 | * | 5/1997 | ............ H01M 10/40 |
| WO | 2013109824 A1 | | 7/2013 | |

* cited by examiner

FLEXIBLE MEMBRANES AND COATED ELECTRODES FOR LITHIUM BASED BATTERIES

CROSS-REFERENCE TO RELATED APPLICATIONS

This application claims the benefit of U.S. Provisional Patent Application Ser. No. 61/868,323 filed Aug. 21, 2013, which is incorporated by reference herein in its entirety.

BACKGROUND

Secondary, or rechargeable, lithium ion batteries and lithium-sulfur batteries are often used in many stationary and portable devices such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a flexible membrane includes a porous membrane and a solid electrolyte coating formed on at least a portion of a surface of the porous membrane, in pores of the porous membrane, or both on the surface and in the pores of the porous membrane. The solid electrolyte coating includes i) a polymer chain or ii) an inorganic ionically conductive material. The polymer chain or the inorganic ionically conductive material includes a group to interact or react with a polysulfide through covalent bonding or supramolecular interaction.

A coated electrode, a lithium battery, and a method for coating a lithium battery component are also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium-sulfur batteries and lithium ion batteries generally operate by reversibly passing lithium ions between a negative electrode (sometimes called an anode) and a positive electrode (sometimes called a cathode). The negative and positive electrodes are often situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes.

It has been found that the lithium-sulfur battery life cycle may be limited by the migration, diffusion, or shuttling of polysulfides from the sulfur cathode during the battery discharge process, through the porous polymer separator, to the anode. The $S_x$ polysulfides generated at the cathode are soluble in the electrolyte, and can migrate to the anode (e.g., a lithium electrode) where they react with the anode in a parasitic fashion to generate lower-order polysulfides. These polysulfides diffuse back to the cathode and regenerate the higher forms of polysulfide. As a result, a shuttle effect takes place. This effect leads to decreased sulfur utilization, self-discharge, poor cyclability, and reduced Coulombic efficiency of the battery. It is believed that even a small amount of polysulfide at the anode can lead to parasitic loss of active lithium at the anode, which prevents reversible electrode operation and reduces the useful life of the lithium-sulfur battery.

Similarly, in the lithium ion battery, transition metal cations can dissolve in the electrolyte and migrate from the cathode of the lithium ion battery to the anode, leading to its "poisoning". In one example, a graphite electrode (e.g., anode) is poisoned by $Mn^{+2}$ or $Mn^{+3}$ cations that dissolve from spinel $Li_xMn_2O_4$ of the positive electrode/cathode. For instance, the $Mn^{+2}$ cations may migrate through the battery electrolyte, and deposit onto the graphite electrode. When deposited onto the graphite, the $Mn^{+2}$ cations become Mn metal. It has been shown that a relatively small amount (e.g., 90 ppm) of Mn atoms can poison the graphite electrode and prevent reversible electrode operation, thereby reducing the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge—discharge cycling).

In some of the examples disclosed herein, the shuttling of polysulfide in the lithium-sulfur battery or the diffusion of $Mn^{+2}$ (or other transition metal) cations in the lithium ion battery may be reduced or prevented by incorporating a solid electrolyte coating on a surface of and/or in pores of a porous membrane. This will be described further in reference to FIG. 1. In other of the examples disclosed herein, the deleterious effects of migrating polysulfides of the lithium-sulfur battery or $Mn^{+2}$ (or other transition metal) cations of the lithium ion battery may be reduced or prevented by incorporating the solid electrolyte coating on a surface of the cathode. This will be described further in reference to FIG. 2. With all of the examples disclosed herein, the solid electrolyte coating is believed to prevent the shuttling of polysulfides between the cathode and the anode or the migration of transition metal cations (e.g., manganese cations) from the cathode to the anode.

Figure 1:
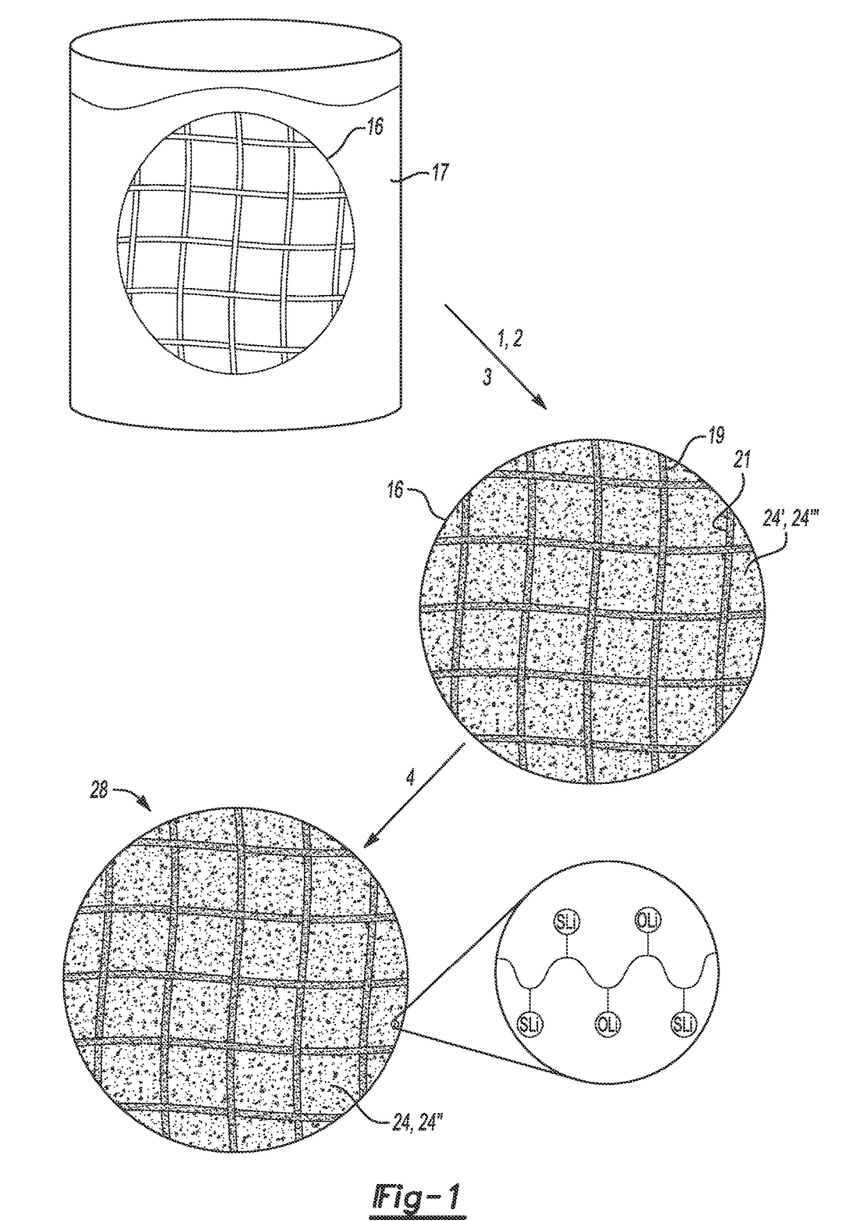
FIG. 1 is a schematic flow diagram depicting an example of a method for coating a porous membrane.

Referring now to FIG. 1, an example of the method for forming a flexible membrane 28 is schematically depicted.

At the outset, a porous membrane 16 is selected. The porous membrane 16 may be a porous polymer membrane or a porous inorganic membrane.

In an example in which the porous polymer membrane is used, the membrane 16 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. The polyolefin porous membrane 16 may also be untreated or treated (e.g., with a surfactant). Commercially available porous polymer membranes include single layer polypropylene membranes, such as CELGARD 2400, CELGARD 2500, and CELGARD 2325 from Celgard, LLC (Charlotte, N.C.).

In another example, the membrane 16 of the flexible membrane 28 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the membrane 16 of the flexible membrane 28 is poly(p-hydroxybenzoic acid). In yet another example, the membrane 16 of the flexible membrane 28 may be chosen from a combination of the polyolefin (such as PE and/or PP) and one or more of the polymers for the membrane 16 listed above.

In an example in which the porous inorganic membrane is used, the membrane 16 may be formed, e.g., from a porous ceramic membrane, a porous oxide membrane, a porous nitride membrane, a porous silicate membrane, a porous carbide membrane, etc. Examples of the porous oxide membrane include membranes of aluminum oxide, zirconium oxide, or magnesium oxide. An example of the porous nitride membrane includes a silicon nitride membrane. An example of the porous carbide membrane includes a silicon carbide membrane.

Whether a polymer or an inorganic porous membrane 16 is selected, the porous membrane 16 may be a single layer or may be a multi-layer laminate fabricated from either a dry or wet process. In some instances, the membrane 16 may include fibrous layer(s) to impart appropriate structural and porosity characteristics.

The porous membrane 16 is exposed to a solution/dispersion 17, which includes a solid electrolyte precursor dissolved or dispersed in a solvent. It is to be understood that any solid electrolyte precursor may be used that is capable of forming a polymer or an inorganic material that can react with or interact with a polysulfide in the case of a lithium-sulfur battery to introduce an anion (e.g., oxygen anion(s) and/or sulfur anion(s)) on the chain(s) of the polymer or to the inorganic material. The anion(s) that is/are introduced on the polymer or to the inorganic material may be covalently bonded or held via supramolecular interaction.

In an example, the solid electrolyte precursor is a monomer that undergoes polymerization to form polydopamine, polythiophene, polypyrrole, polyaniline, polyacetylene, polyphenylacetylene, polydiacetylene, polyamide, or derivatives of these polymers (e.g., such as poly(N-isopropylacrylamide) and poly(3,4-ethylenedioxythiophene)). In other words, the solid electrolyte precursor may be a monomer selected from dopamine, thiophene, pyrrole, aniline, ethyne, phenylacetylene, diacetylene, and/or a monomer including an amino group and a carboxylic acid or an acid chloride group.

In another example, the solid electrolyte precursor is an inorganic ionically conductive compound that forms a solid electrolyte upon exposure to heat. Examples of the inorganic solid electrolyte that can be formed from the inorganic compound include $Li_{1.3}Ti_{1.7}Al_{0.3}(PO_4)_3$, $Li_7Zr_2R_3O_{12}$, $La_{0.5}Li_{0.5}TiO_3$, a thio-lithium superionic conductor (thio-LISICON), lithium superionic conductor (LISICON), $Li_{3.25}Ge_{0.25}P_{0.75}S_4$, a glass ceramic ($Li_7P_3S_{11}$), a glassy material (e.g., $Li_2S$—$SiS_2$—$Li_3PO_4$), lithium phosphorus oxynitride (LIPON), Li-alumina, $Li_{14}Zn(GeO_4)_4$, and $Li_2B_4O_7$.

The solvent of the solution/dispersion 17 may be water, an alcohol, or a mixture thereof.

It is to be understood that the polymer or inorganic membrane 16 may be used with either the solution/dispersion 17 that includes the monomer or the inorganic compound. However, some of the inorganic ionically conductive compounds may be undesirable for use with the polymer membrane 16 due to the heat treatment.

As illustrated in FIG. 1, the exposing step may be accomplished by immersing the porous membrane 16 in the solution/dispersion 17. In other examples, the exposing step may be accomplished by depositing the solution/dispersion 17 on the porous membrane 16. Deposition of the solution/dispersion 17 may be accomplished using spin-coating or a vapor deposition technique, such as chemical vapor deposition (CVD), physical vapor deposition (PVD), atomic layer deposition (ALD), cathodic arc deposition, or pulse laser deposition.

In one example of the method shown in FIG. 1, the solution/dispersion 17 includes the monomer as the solid electrolyte precursor. In this example, the monomer in the solution/dispersion 17 undergoes in-situ oxidation (reference numeral 1) and polymerization (reference numeral 2) to form a polymer solid electrolyte coating precursor 24' on at least some of the surface 19 of the porous membrane 16 and in the pores 21 of the porous membrane 16. The oxidation (i.e., oxygen initiated rearrangement) and polymerization (i.e., oxygen initiated polymerization) may be initiated using any suitable oxidant, such as air, persulfate salts, etc. In an example, the oxidation 1 and polymerization 2 take place in air and at room temperature (e.g., ranging from about 18° C. to about 30° C.). In another example, the oxidation 1 and polymerization 2 take place in air and at a temperature ranging from about 0° C. to about 100° C.

The polymer solid electrolyte coating precursor 24' is a polymeric solid electrolyte coating that is formed on surface(s) 19 of and/or in pore(s) 21 of the membrane 16. It is to be understood that this coating 24' is referred to herein as a precursor because it is further reacted or interacted to generate the desired polymer solid electrolyte coating 24.

In another example of the method shown in FIG. 1, the solution/dispersion 17 includes the inorganic compound as the solid electrolyte precursor. In this example, the inorganic compound in the solution/dispersion 17 is exposed to a heat treatment (reference numeral 3) to form an inorganic solid electrolyte coating precursor 24''' on at least some of the surface 19 of the porous membrane 16 and in the pores 21 of the porous membrane 16. A temperature of the heat treatment may vary depending upon the inorganic compound used, and may range from about 50° C. to about 1500° C.

The inorganic solid electrolyte coating precursor 24''' is an inorganic solid electrolyte coating that is formed on surface(s) 19 of and/or in pore(s) 21 of the membrane 16. It is to be understood that this coating 24''' is referred to herein as a precursor because it is further reacted or interacted to generate the desired inorganic solid electrolyte coating 24".

At reference numeral 4 in FIG. 1, the polymer solid electrolyte coating precursor 24' or the inorganic solid electrolyte coating precursor 24''' is reacted with or interacted with polysulfide anions to introduce an anion (e.g., oxygen and/or sulfur anions) in the place of another group on the polymer chains or the inorganic material. This reaction or interaction forms the polymer solid electrolyte coating 24 or the inorganic solid electrolyte coating 24". In an example, the polymer solid electrolyte coating 24 or the inorganic solid electrolyte coating 24" is reacted or interacted with polysulfide lithium, which forms —OLi and/or —SLi pendant groups (as shown in the enlarged portion of FIG. 1) in place of another group along the polymer chain(s) or on the inorganic compound.

The anions that are introduced onto the polymer chain(s) of the polymer solid electrolyte coating 24 or onto the inorganic solid electrolyte coating 24" enable the flexible membrane 28 to function as a solid electrolyte. More specifically, lithium cations are able to move along the anion(s) that is/are introduced. Anion saturation of the polymer chain(s) or inorganic compound(s) creates electrostatic repulsion between the coating 24 or 24" and polysulfides from the sulfur cathode. It is believed that this electrostatic repulsion suppresses the diffusion of the polysulfides across the flexible membrane 28 in examples of the lithium-sulfur battery. Additionally, the polymer solid electrolyte coating 24 or the inorganic solid electrolyte coating 24" fills the pores of the membrane 16, rendering the flexible membrane 28 substantially non-porous. The lack of porosity in the resulting flexible membrane 28 physically prevents the diffusion of polysulfides.

The thickness of the polymer solid electrolyte coating 24 or the inorganic solid electrolyte coating 24" may be controlled by altering the concentration of the monomer or inorganic compound in the solution/dispersion 17. In an example, the thickness of the polymer solid electrolyte coating 24 or the inorganic solid electrolyte coating 24" ranges from about 10 nm to about 2 μm.

Figure 2:
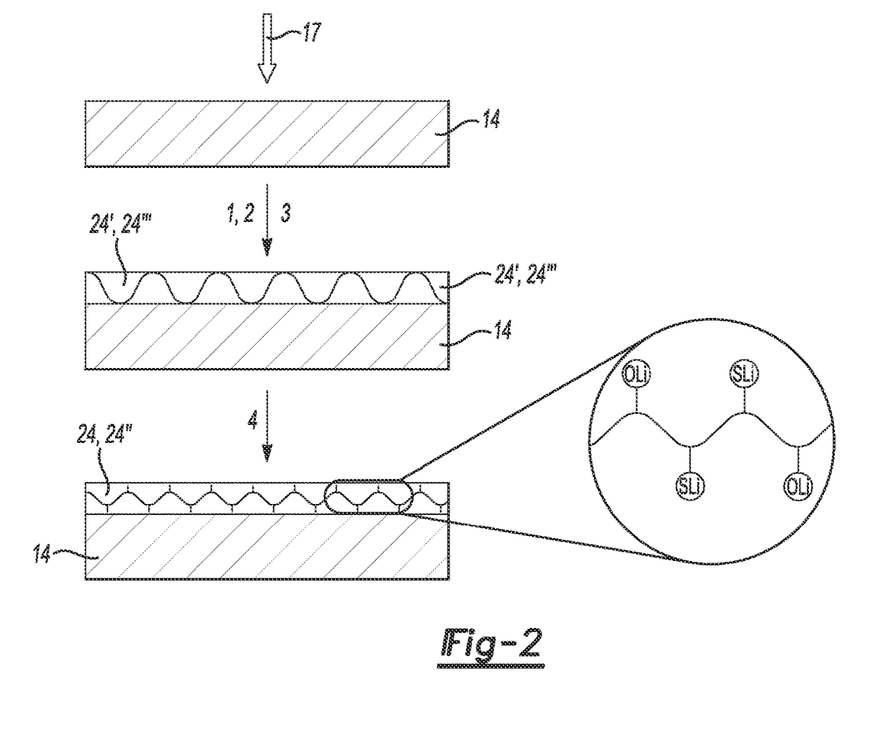
FIG. 2 is a schematic flow diagram depicting an example of a method for coating a positive electrode.

Referring now to FIG. 2, an example of the method for forming a coated cathode is schematically depicted.

At the outset, a cathode 14 is selected. When the cathode 14 is to be used in a lithium-sulfur battery, the cathode 14 may be formed from any sulfur-based active material that can sufficiently undergo lithium alloying and dealloying with aluminum or another suitable current collector functioning as the positive terminal of the lithium-sulfur battery. Examples of sulfur-based active materials include $S_8$, $Li_2S_8$, $Li_2S_6$, $Li_2S_4$, $Li_2S_3$, $Li_2S_2$, and $Li_2S$.

The cathode 14 may also include a polymer binder material and a conductive filler to structurally hold the sulfur-based active material together. The polymeric binder may be made of at least one of polyvinylidene fluoride (PVdF), an ethylene propylene diene monomer (EPDM) rubber, carboxymethyl cellulose (CMC), or sodium alginate or other water-soluble binders. The polymer binder structurally holds the sulfur-based active material and the conductive filler together. An example of the conductive filler is a high surface area carbon, such as acetylene black or activated carbon. The conductive filler ensures electron conduction between the positive-side current collector and the sulfur-based active material. In an example, the positive electrode active material and the polymer binder may be encapsulated with carbon.

When the cathode 14 is to be used in a lithium ion battery, the cathode 14 may be formed from any lithium-based active material that can sufficiently undergo lithium insertion and deinsertion while aluminum or another suitable current collector is functioning as the positive terminal of the lithium ion battery. One common class of known lithium-based active materials suitable for the cathode 14 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [Li($Ni_{0.5}Mn_{1.5}$)$O_2$], a layered nickel-manganese-cobalt oxide [Li($Ni_xMn_yCo_z$)$O_2$ or Li($Ni_xMn_yCo_z$)$O_4$, or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), $xLi_2MnO_{3-(1-x)}LiMO_2$ (M is composed of any ratio of Ni, Mn and/or Co), and any other high efficiency nickel-manganese-cobalt material (HE-NMC). By "any ratio" it is meant that any element may be present in any amount. So, for example, M could be Al, with or without Co and/or Mg, or any other combination of the listed elements.

The cathode 14 may include a lithium transition metal oxide-based active material intermingled with a polymeric binder and mixed with a high surface area carbon. Suitable binders include polyvinylidene fluoride (PVdF), an ethylene propylene diene monomer (EPDM) rubber, and/or carboxymethyl cellulose (CMC). The polymeric binder structurally holds the lithium-based active materials and the high surface area carbon together. An example of the high surface area carbon is acetylene black. The high surface area carbon ensures electron conduction between the positive-side current collector 14a and the active material particles of the cathode 14.

The selected cathode 14 is exposed to the solution/dispersion 17 by immersing the cathode 14 in the solution/dispersion 17 or by depositing the solution/dispersion 17 onto a surface of the cathode 14. One example of a suitable deposition technique is spin-coating. Any examples of the monomer or inorganic compound and the solvent may be used in this example of the solution/dispersion 17.

In an example, the monomer in the solution/dispersion 17 that has been deposited on the cathode surface then undergoes in-situ oxidation (reference numeral 1) and polymerization (reference numeral 2) to form the polymer solid electrolyte coating precursor 24' on the surface of the cathode 14. In another example, the inorganic compound in the solution/dispersion 17 that has been deposited on the cathode surface is then exposed to the heat treatment (reference numeral 3) and/or vacuum dried to form the inorganic solid electrolyte coating precursor 24''' on the surface of the cathode 14.

The polymer solid electrolyte coating precursor 24' is a polymer coating that is formed on the surface of the cathode 14. Similarly, the inorganic solid electrolyte coating precursor 24''' is an inorganic solid electrolyte coating that is formed on the surface of the cathode 14. As previously described, it is to be understood that these coatings 24', 24''' are referred to herein as precursors because they are further reacted or interacted to generate the desired polymer coating 24 or inorganic coating 24". At reference numeral 4 in FIG. 2, the polymer solid electrolyte coating precursor 24' or the inorganic solid electrolyte coating precursor 24''' is reacted or interacted with polysulfide anions to introduce oxygen and/or sulfur and/or some other anions to the polymer chains or inorganic material. This reaction/interaction forms the polymer solid electrolyte coating 24 or the inorganic solid electrolyte coating 24". In an example, the precursor 24' or 24''' is reacted with polysulfide lithium, which forms —OLi and/or —SLi pendant groups along the polymer chain(s) or inorganic compound(s) (as shown in the enlarged portion of FIG. 2).

The anions that are introduced onto the polymer chain(s) of the polymer solid electrolyte coating 24 or onto the inorganic solid electrolyte coating 24" enable the polymer coating 24 to function as a solid electrolyte. More specifically, lithium cations are able to move along the anions. Anion saturation of the polymer chain(s) or inorganic compound(s) creates electrostatic repulsion between the coating 24 or 24" and polysulfides from the cathode 14 which contains sulfur. It is believed that this electrostatic repulsion suppresses the diffusion of the polysulfides across the coating 24, 24" in examples of the lithium-sulfur battery.

Additionally, the polymer solid electrolyte coating 24 or the inorganic solid electrolyte coating 24" is non-porous. The lack of porosity in the coating 24, 24" physically prevents the diffusion of polysulfides (in a lithium-sulfur battery) or $Mn^{2+}$ (in a lithium ion battery). This creates a physical diffusion barrier adjacent to the cathode 14.

In this example of the method, the thickness of the polymer solid electrolyte coating 24 or the inorganic solid electrolyte coating 24" may be controlled as previously described.

Figure 3:
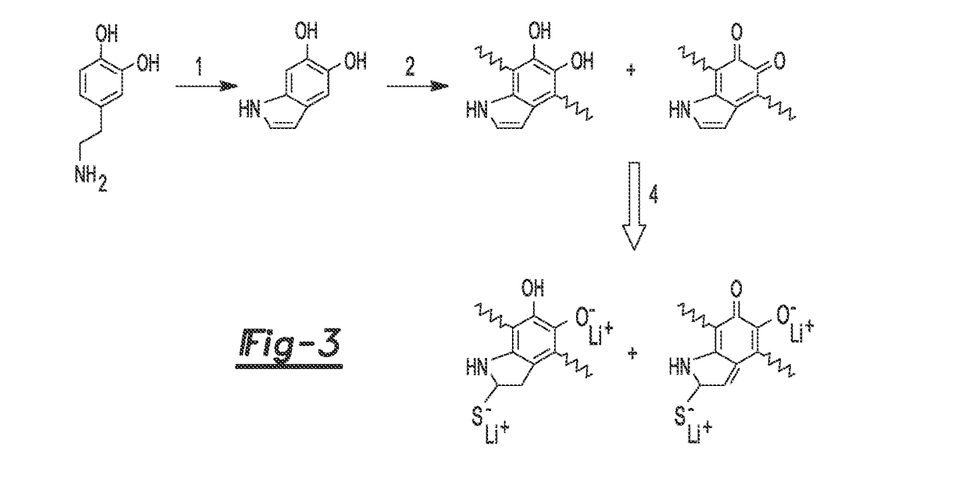
FIG. 3 is a flow diagram depicting the chemical structures used and formed in an example of the method.

FIG. 3 illustrates an example of the chemistry taking place at oxidation 1, polymerization 2, and reaction with polysulfide 4 when dopamine is used as the monomer.

Figure 4:
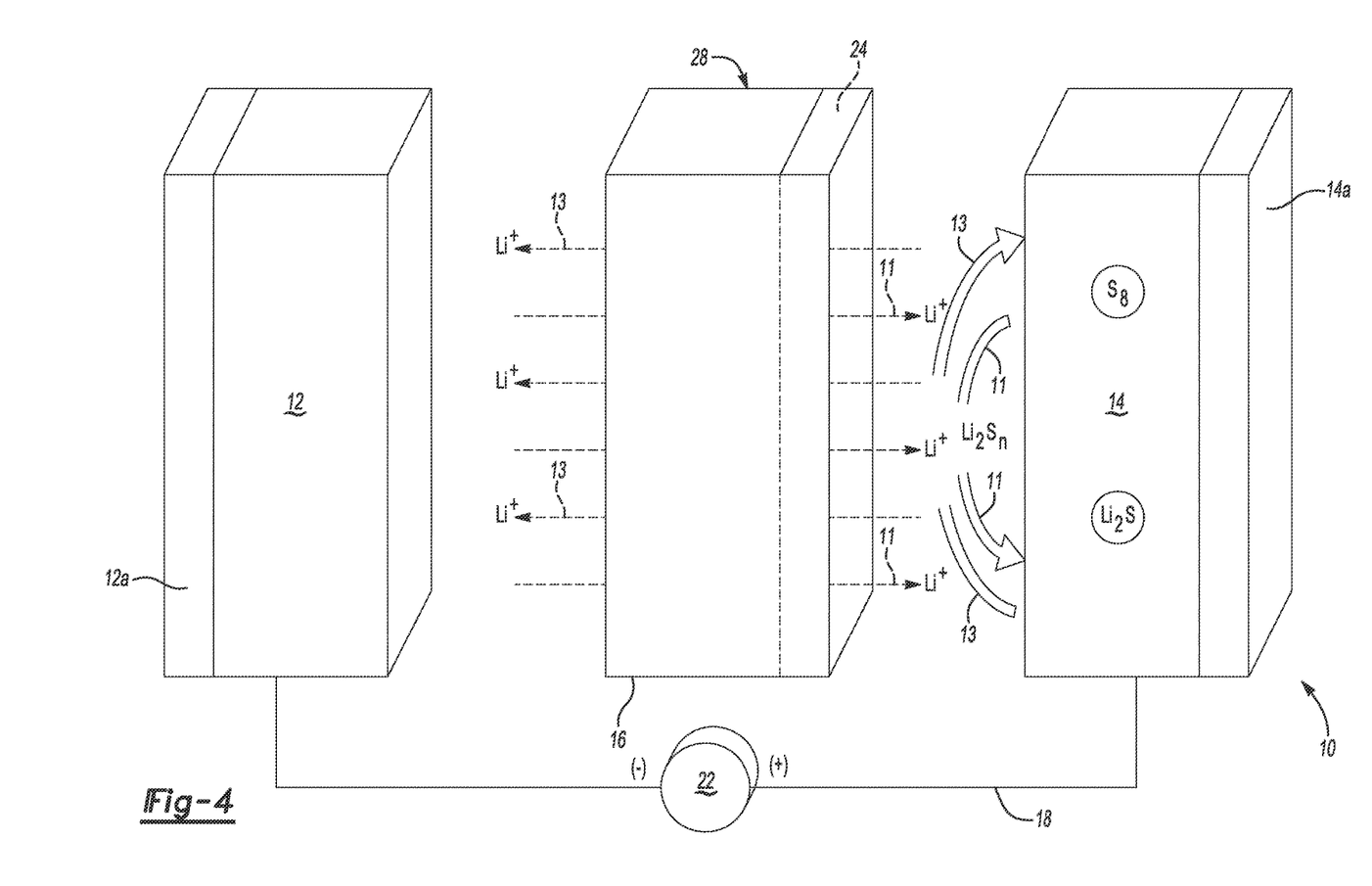
FIG. 4 is a schematic, perspective view of an example of a lithium-sulfur battery illustrating both a charging state and a discharging state, the battery including an example of the flexible membrane including a polymer solid electrolyte coating according to the present disclosure.

An example of a secondary lithium-sulfur battery 10 is schematically shown in FIG. 4. The battery 10 generally includes an anode 12, a cathode 14, and the flexible membrane 28. The flexible membrane 28 includes a porous membrane 16 having the solid electrolyte coating 24 formed on its surface and/or in its pores. The lithium-sulfur battery 10 also includes an interruptible external circuit 18 that connects the anode 12 and the cathode 14. Each of the anode 12, the cathode 14, and the flexible membrane 28 may be soaked in an electrolyte solution that is capable of conducting lithium ions. The presence of the electrolyte solution may provide a larger contact surface for lithium ion transport and may enhance the conductivity of the cathode 14.

The flexible membrane 28, which operates as both an electrical insulator and a mechanical support, is sandwiched between the anode 12 and the cathode 14 to prevent physical contact between the two electrodes 12, 14 and the occurrence of a short circuit. The flexible membrane 28 (i.e., the membrane 16 and solid electrolyte coating 24), in addition to providing a physical barrier between the two electrodes 12, 14, ensures passage of lithium ions (identified by the $Li^+$) through the solid electrolyte filling its pores. However, as discussed above, the flexible membrane 28 also blocks the passage of polysulfide ions due to the presence of the solid electrolyte coating 24.

A negative-side current collector 12a and a positive-side current collector 14a may be positioned in contact with the anode 12 and the cathode 14, respectively, to collect and move free electrons to and from the external circuit 18. The positive-side current collector 14a may be formed from aluminum or any other appropriate electrically conductive material known to skilled artisans. The negative-side current collector 12a may be formed from copper or any other appropriate electrically conductive material known to skilled artisans.

The lithium-sulfur battery 10 may support a load device 22 that can be operatively connected to the external circuit 18. The load device 22 receives a feed of electrical energy from the electric current passing through the external circuit 18 when the lithium-sulfur battery 10 is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be a power-generating apparatus that charges the lithium-sulfur battery 10 for purposes of storing energy. For instance, the tendency of windmills and solar panels to variably and/or intermittently generate electricity often results in a need to store surplus energy for later use.

The lithium-sulfur battery 10 can include a wide range of other components that, while not depicted here, are nonetheless known to skilled artisans. For instance, the lithium-sulfur battery 10 may include a casing, gaskets, terminals, tabs, and any other desirable components or materials that may be situated between or around the anode 12 and the cathode 14 for performance-related or other practical purposes. Moreover, the size and shape of the lithium-sulfur battery 10, as well as the design and chemical make-up of its main components, may vary depending on the particular application for which it is designed. Battery-powered automobiles and hand-held consumer electronic devices, for example, are two instances where the lithium-sulfur battery 10 would most likely be designed to different size, capacity, and power-output specifications. The lithium-sulfur battery 10 may also be connected in series and/or in parallel with other similar lithium-sulfur batteries 10 to produce a greater voltage output and current (if arranged in parallel) or voltage (if arranged in series) if the load device 22 so requires.

The lithium-sulfur battery 10 can generate a beneficial electric current during battery discharge (shown by reference numeral 11 in FIG. 4). During discharge, the chemical processes in the battery 10 include lithium (Li$^+$) dissolution from the surface of the anode 12 and incorporation of the lithium cations into alkali metal polysulfide salts (i.e., Li$_2$S$_n$) in the cathode 14. As such, polysulfides are formed (sulfur is reduced) on the surface of the cathode 14 in sequence while the battery 10 is discharging. The chemical potential difference between the cathode 14 and the anode 12 (ranging from approximately 1.5 to 3.0 volts, depending on the exact chemical make-up of the electrodes 12, 14) drives electrons produced by the dissolution of lithium at the anode 12 through the external circuit 18 towards the cathode 14. The resulting electric current passing through the external circuit 18 can be harnessed and directed through the load device 22 until the lithium in the anode 12 is depleted and the capacity of the lithium-sulfur battery 10 is diminished.

The lithium-sulfur battery 10 can be charged or re-powered at any time by applying an external power source to the lithium-sulfur battery 10 to reverse the electrochemical reactions that occur during battery discharge. During charging (shown at reference numeral 13 in FIG. 4), lithium plating to the anode 12 takes place and sulfur formation at the cathode 14 takes place. The connection of an external power source to the lithium-sulfur battery 10 compels the otherwise non-spontaneous oxidation of lithium polysulfide at the cathode 14 to produce electrons and release lithium ions. The electrons, which flow back towards the anode 12 through the external circuit 18, and the lithium ions (Li$^+$), which are carried by the solid electrolyte coating 24 across the flexible membrane 28 back towards the anode 12, reunite at the anode 12 and replenish it with lithium for consumption during the next battery discharge cycle. The external power source that may be used to charge the lithium-sulfur battery 10 may vary depending on the size, construction, and particular end-use of the lithium-sulfur battery 10. Some suitable external power sources include a battery charger plugged into an AC wall outlet and a motor vehicle alternator.

The anode 12 may include any lithium host material that can sufficiently undergo lithium plating and stripping while copper or another suitable current collector material is functioning as the negative terminal of the lithium-sulfur battery 10. The negative electrode 12 may also include a polymer binder material to structurally hold the lithium host material together. For example, the negative electrode 12 may be formed of an active material, made from graphite or a low surface area amorphous carbon, intermingled with a binder, made from polyvinylidene fluoride (PVdF), an ethylene propylene diene monomer (EPDM) rubber, or carboxymethyl cellulose (CMC). These materials may be mixed with a high surface area carbon, such as acetylene black, to ensure electron conduction between the current collector 12a and the active material particles of the anode 12. Graphite is widely utilized to form the negative electrode because it exhibits reversible lithium intercalation and deintercalation characteristics, is relatively non-reactive, and can store lithium in quantities that produce a relatively high energy density. Commercial forms of graphite that may be used to fabricate the anode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate. As previously mentioned, the negative-side current collector 12a may be formed from copper or any other appropriate electrically conductive material known to skilled artisans.

The cathode 14 of the lithium-sulfur battery 10 may be formed from any sulfur-based active material that can sufficiently undergo lithium alloying and dealloying while aluminum or another suitable current collector is functioning as the positive terminal of the lithium-sulfur battery 10. As previously described in reference to FIG. 2, examples of sulfur-based active materials include S$_8$, Li$_2$S$_8$, Li$_2$S$_6$, Li$_2$S$_4$, Li$_2$S$_2$, and Li$_2$S. In addition, any of the binder(s) and/or conductive materials previously described may be used, and/or the cathode 14 may be encapsulated with carbon.

Any appropriate electrolyte solution that can conduct lithium ions between the anode 12 and the cathode 14 may be used in the lithium-sulfur battery 10. The electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(FSO$_2$)$_2$, LiN(CF$_3$SO$_2$)$_2$, LiB(C$_2$O$_4$)$_2$ (LiBOB), LiBF$_2$(C$_2$O$_4$) (LiODFB), LiPF$_4$(C$_2$O$_4$) (LiFOP), LiNO$_3$, LiPF$_6$, LITFSI, and mixtures thereof. In one example, the electrolyte solution may be an ether based electrolyte that is stabilized with lithium nitrite (e.g., LiTFSI and LiNO$_3$ in 1,3-dioxolane and 1,2-dimethoxyethane).

Figure 5:
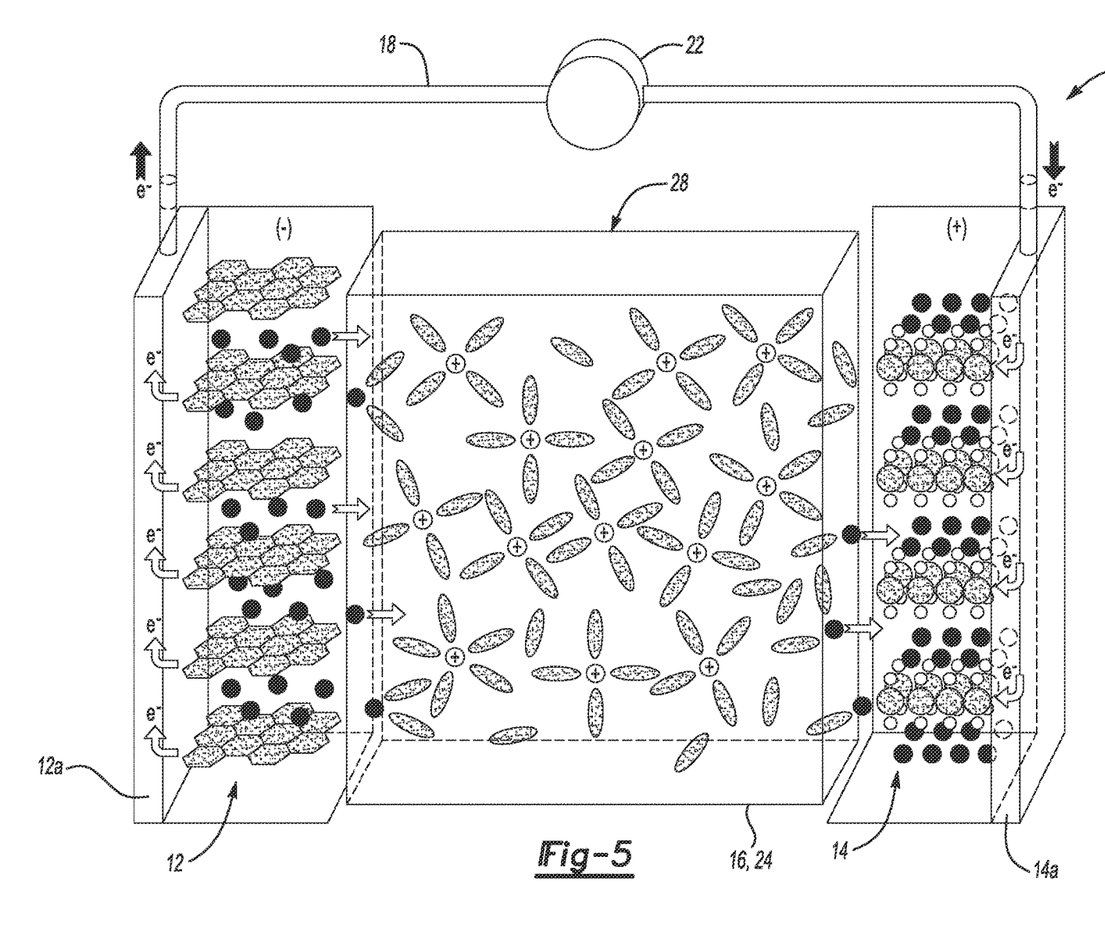
FIG. 5 is a schematic, perspective view of an example of a lithium ion battery during a discharging state, the battery including an example of the flexible membrane including a polymer solid electrolyte coating according to the present disclosure.

An example of a secondary lithium ion battery 10' is schematically shown in FIG. 5. The battery 10' generally includes an anode 12, a cathode 14, and the flexible membrane 28 positioned between the anode 12 and cathode 14 shown in FIG. 1. It is to be understood that the flexible membrane 28 includes the porous membrane 16 having the polymer coating 24 formed in the pores and/or on at least a portion of the surface of the membrane 16. The lithium ion battery 10' also includes an interruptible external circuit 18 that connects the anode 12 and the cathode 14.

Each of the anode 12, the cathode 14, and the flexible membrane 28 may be soaked in an electrolyte solution that is capable of conducting lithium ions. The presence of the electrolyte solution may provide a larger contact surface for lithium ion transport and may enhance the conductivity of the cathode 14.

The flexible membrane 28 functions as a solid electrolyte that is capable of conducting lithium ions as previously described herein. The flexible membrane 28 may be formed via the method shown and described in reference to FIG. 1. In an example, the membrane 16 may be a polypropylene membrane (CELGARD 2400 or 2500 from Celgard, LLC), and the polymer solid electrolyte coating 24 may be a polydopamine having pendant oxygen anion(s) and sulfur anion(s). While the polymer membrane 16 and coating 24 are shown in FIG. 5, it is to be understood that the flexible membrane 28 could also include the polymer membrane 16 coated with the inorganic solid electrolyte coating 24" or the inorganic membrane 16 coated with either the polymer solid electrolyte coating 24 or the inorganic solid electrolyte coating 24".

The flexible membrane 28 operates as both an electrical insulator and a mechanical support, and is sandwiched between the anode 12 and the cathode 14 to prevent physical contact between the two electrodes 12, 14 and the occurrence of a short circuit. If the polymer coating 24 is formed on a surface of and in the pores of membrane 16, it may be positioned so that the bulk of the coating 24 at the surface faces the cathode 14. The flexible membrane 28 (i.e., the membrane 16 and the polymer solid electrolyte coating 24), in addition to providing a physical barrier between the two electrodes 12, 14, ensures passage of lithium ions (identified by the black dots and by the open circles having a (+) charge in FIG. 5) through the solid electrolyte 24 filling the pores of the membrane 16. In this example, the flexible membrane 28 also blocks the passage of manganese cations due to the presence of the polymer coating 24.

A negative-side current collector 12$a$ and a positive-side current collector 14$a$ may be positioned in contact with the anode 12 and the cathode 14, respectively, to collect and move free electrons to and from the external circuit 18. It is to be understood that the negative-side current collector 12$a$ and positive-side collector 14$a$ described herein for the lithium-sulfur battery 10 may also be used in the lithium ion battery 10'.

The lithium ion battery 10' may support a load device 22 that can be operatively connected to the external circuit 18 that connects the anode 12 and the cathode 14. The load device 22 receives a feed of electrical energy from the electric current passing through the external circuit 18 when the lithium ion battery 10' is discharging. While the load device 22 may be any number of known electrically-powered devices, a few specific examples of a power-consuming load device include an electric motor for a hybrid vehicle or an all-electrical vehicle, a laptop computer, a cellular phone, and a cordless power tool. The load device 22 may also, however, be a power-generating apparatus that charges the lithium ion battery 10' for purposes of storing energy. For instance, the tendency of windmills and solar panels to variably and/or intermittently generate electricity often results in a need to store surplus energy for later use.

The lithium ion battery 10' can include a wide range of other components that, while not depicted here, are nonetheless known to skilled artisans. For instance, the lithium ion battery 10' may include a casing, gaskets, terminals, tabs, and any other desirable components or materials that may be situated between or around the anode 12 and the cathode 14 for performance-related or other practical purposes. Moreover, the size and shape of the lithium ion battery 10', as well as the design and chemical make-up of its main components, may vary depending on the particular application for which it is designed. Battery-powered automobiles and hand-held consumer electronic devices, for example, are two instances where the lithium-sulfur battery 10' would most likely be designed to different size, capacity, and power-output specifications. The lithium ion battery 10' may also be connected in series and/or in parallel with other similar lithium ion battery 10' to produce a greater voltage output and current (if arranged in parallel) or voltage (if arranged in series) if the load device 22 so requires.

The lithium ion battery 10' generally operates by reversibly passing lithium ions between the anode 12 and the cathode 14. In the fully charged state, the voltage of the battery 10' is at a maximum (typically in the range 2.0V to 5.0V); while in the fully discharged state, the voltage of the battery 10' is at a minimum (typically in the range 0V to 2.0V). Essentially, the Fermi energy levels of the active materials in the anode 12 and cathode 14 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 22 enables an electronic current flow in the external circuit 18 with a direction such that the difference between the Fermi levels (and, correspondingly, the cell voltage) decreases. The reverse happens during battery charging: the battery charger forces an electronic current flow in the external circuit 18 with a direction such that the difference between the Fermi levels (and, correspondingly, the cell voltage) increases.

At the beginning of a discharge, the anode 12 of the lithium ion battery 10' contains a high concentration of intercalated lithium while the cathode 14 is relatively depleted. When the anode 12 contains a sufficiently higher relative quantity of intercalated lithium, the lithium ion battery 10' can generate a beneficial electric current by way of reversible electrochemical reactions that occur when the external circuit 18 is closed to connect the anode 12 and the cathode 14. The establishment of the closed external circuit under such circumstances causes the extraction of intercalated lithium from the anode 12. The extracted lithium atoms are split into lithium ions (identified by the black dots and by the open circles having a (+) charge) and electrons ($e^-$) as they leave an intercalation host at the negative electrode-electrolyte interface.

The chemical potential difference between the cathode 14 and the anode 12 (ranging from about 2.0V to about 5.0V, depending on the exact chemical make-up of the electrodes 14, 12) drives the electrons ($e^-$) produced by the oxidation of intercalated lithium at the anode 12 through the external circuit 18 towards the cathode 14. The lithium ions are concurrently carried by the electrolyte solution through the flexible membrane 28 towards the cathode 14. The electrons ($e^-$) flowing through the external circuit 18 and the lithium ions migrating across the flexible membrane 28 in the electrolyte solution eventually reconcile and form intercalated lithium at the cathode 14. The electric current passing through the external circuit 18 can be harnessed and directed through the load device 22 until the level of intercalated lithium in the anode 12 falls below a workable level or the need for electrical energy ceases.

The lithium ion battery 10' can be charged or re-powered at any time after a partial or full discharge of its available capacity by applying an external power source to the lithium ion battery 10' to reverse the electrochemical reactions that occur during battery discharge. The connection of an external power source to the lithium ion battery 10' compels the otherwise non-spontaneous oxidation of lithium transition metal oxide or phosphate at the cathode 14 to produce electrons and release lithium ions. The electrons, which flow back towards the anode 12 through the external circuit 18, and the lithium ions, which are carried by the solid electrolyte across the flexible membrane 28 back towards the anode 12, reunite at the anode 12 and replenish it with intercalated lithium for consumption during the next battery discharge cycle.

The external power source that may be used to charge the lithium ion battery 10' may vary depending on the size, construction, and particular end-use of the lithium ion battery 10'. Some suitable external power sources include a battery charger plugged into an AC wall outlet and a motor vehicle alternator.

The anode 12 for the lithium ion battery 10' may include any lithium host material that can sufficiently undergo lithium intercalation and deintercalation while functioning as the negative terminal of the lithium ion battery 10'. The anode 12 may also include a polymer binder material to structurally hold the lithium host material together. For example, the anode 12 may be formed of an active material, made from graphite or a low surface area amorphous carbon, intermingled with a binder, made from polyvinylidene fluoride (PVdF), an ethylene propylene diene monomer (EPDM) rubber, or carboxymethyl cellulose (CMC). These materials may be mixed with a high surface area carbon, such as acetylene black, to ensure electron conduction between the current collector 12a and the active material particles of the anode 12. Graphite is widely utilized to form the negative electrode because it exhibits favorable lithium intercalation and deintercalation characteristics, is relatively non-reactive, and can store lithium in quantities that produce a relatively high energy density. Commercial forms of graphite that may be used to fabricate the anode 12 are available from, for example, Timcal Graphite & Carbon (Bodio, Switzerland), Lonza Group (Basel, Switzerland), or Superior Graphite (Chicago, Ill.). Other materials can also be used to form the negative electrode including, for example, lithium titanate.

In the lithium ion battery 10', the cathode 14 may include, for example, any lithium host material that can sufficiently undergo lithium intercalation and deintercalation, binder material, and conductive filler as previously described in reference to FIG. 2.

Any appropriate electrolyte solution that can enhance the conductivity and wet the cathode 14 may be used in the lithium ion battery 10'. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 10 as well as how to manufacture or commercially acquire them. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$, $LiCF_3SO_3$, $LiN(FSO_2)_2$, $LiN(CF_3SO_2)_2$, $LiAsF_6$, $LiPF_6$, LITFSI, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents such as cyclic carbonates (ethylene carbonate, propylene carbonate, butylene carbonate, fluoroethylene), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

In any of the examples disclosed herein, it is to be understood that a liquid electrolyte may be incorporated with the solid electrolyte coating 24, 24" in order to provide better lithium transport between the cathode 14 and the flexible membrane 28 and between the flexible membrane 28 and the anode 12. The liquid electrolyte may be selected for the type of battery (i.e., lithium-sulfur or lithium ion).

It is to be further understood that the coated electrode shown in FIG. 2 may also be used in examples of the lithium-sulfur battery 10 or the lithium ion battery 10'. These examples generally include the anode 12 and the cathode 14 coated with the solid electrolyte coating 24 or 24" (as shown in FIG. 2). This example of the battery 10 or 10' may also include the liquid electrolyte and a conventional separator or flexible membrane. It is to be understood that the solid electrolyte coating 24 or 24" on the cathode 14 separates the cathode 14 from the liquid electrolyte and the anode 12, and functions as the electrolyte for lithium ion transport, as well as a protective layer for the battery. This example of the battery also includes an interruptible external circuit 18 that connects the anode 12 and the cathode 14 and any of the other components previously described herein.

To further illustrate the present disclosure, examples are given herein. It is to be understood that these examples are provided for illustrative purposes and are not to be construed as limiting the scope of the disclosed example(s).

EXAMPLE

A flexible membrane was formed according to an example of the method disclosed herein. A CELGARD separator (2325) was immersed in a solution of dopamine (50 mg to 200 mg) and water (100 mL). Oxidation and polymerization were performed to create a polymer solid electrolyte coating precursor within the pores and on the surface of the CELGARD separator. The polymer solid electrolyte coating precursor was reacted with polysulfide lithium. This flexible membrane was Example 1.

A comparative flexible membrane was also used. A CELGARD separator without any coating was Example 2.

The separator and comparative separator (Examples 1 and 2) were assembled into respective coin cells (i.e., half cells). The coin cells were composed of a lithium metal anode, the example or comparative example flexible membrane, and a sulfur cathode (i.e., 65% sulfur, 25% carbon, and 10% sodium alginate) on an aluminum current collector. The coin cells were assembled in an argon-filled glove box. The electrolyte was a 1.0M LiTFSI (lithium bis(trifluoromethanesulfonyl)imide) solution in dimethoxyethane/dioxolane (DOL/DME). Galvanostatic charge and discharge cycle tests were carried out at 25° C. between 3.0 and 1.5 V, and both examples were tested at a C rate of 0.2 C.

Figure 6:
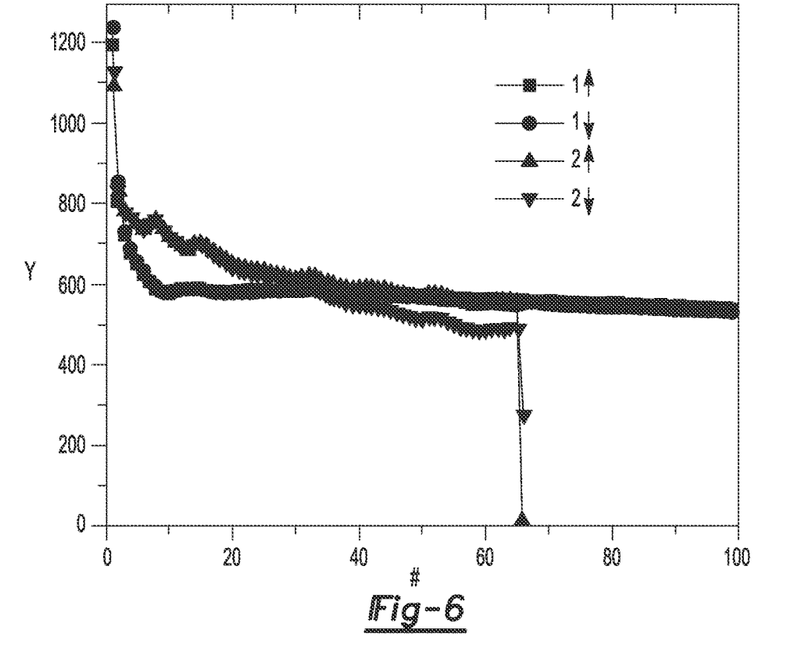
FIG. 6 is a graph illustrating the charge and discharge capacities (mAh/g) for an example battery including a flexible membrane with a polymer solid electrolyte coating and for a comparative example battery.

FIG. 6 illustrates the charge (↑) and discharge (↓) curves for the Example (1) and comparative Example (2). The Y axis (labeled "Y") is the capacity (mAh/g) and the X axis (labeled "#") is the number of cycles. As illustrated, the separator with the polymer coating (1) illustrated the best charge and discharge capacity (Y in FIG. 6, mAh/g) with the longest cycle time (# in FIG. 6). It is believed that the polymer coating reduces polysulfide shuttling, increases sulfur utilization, and improves the life cycle and the capacity of the battery.

Figure 7:
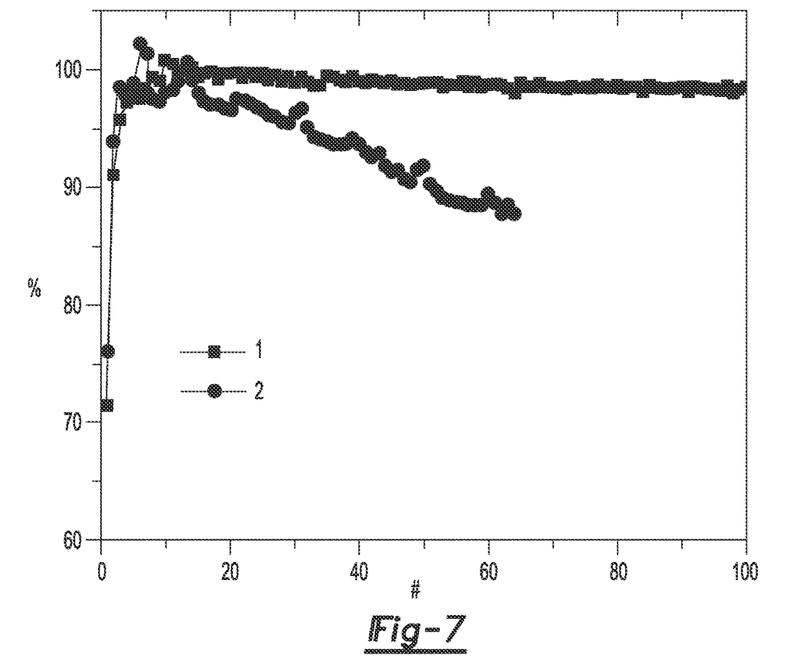
FIG. 7 is a graph illustrating the Coulombic efficiency (%) for the example battery including the flexible membrane with the polymer solid electrolyte coating and for the comparative example battery.

FIG. 7 illustrates the Coulombic efficiency of Examples 1 and 2. The Y axis (labeled "%") is the Coulombic efficiency and the X axis (labeled "#") is the number of cycles. These results indicate that the separator with the polymer coating (1) exhibits improved cycle efficiency. The comparative example, Example 2, had a decreased Coulombic efficiency and also had a reduced life cycle, when compared to Example 1.

It is to be understood that the ranges provided herein include the stated range and any value or sub-range within the stated range. For example, a range of about 18° C. to about 30° C. should be interpreted to include not only the explicitly recited limits of about 18° C. to about 30° C., but also to include individual values, such as 19° C., 22° C., 27.75° C., etc., and sub-ranges, such as from about 18.5° C. to about 29.5° C.; from about 20° C. to about 28° C., etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A flexible membrane, comprising:
a porous membrane; and
a solid electrolyte coating formed on at least a portion of a surface of the porous membrane, in pores of the porous membrane, or both on the surface and in the pores, the solid electrolyte coating including a polymer chain selected from the group consisting of polydopamine, polythiophene, polypyrrole, polyaniline, polyacetylene, polyphenylacetylene, polydiacetylene, and derivatives thereof, the polymer chain being saturated with oxygen anions or sulfur anions to enable diffusion of lithium cations, and to suppress diffusion of polysulfide anions.

2. The flexible membrane as defined in claim 1 wherein the porous membrane is selected from the group consisting of a porous polymer membrane or a porous inorganic membrane.

3. The flexible membrane as defined in claim 2 wherein the porous polymer membrane is a surfactant treated porous polypropylene membrane or a surfactant treated porous polyethylene membrane.

4. The flexible membrane as defined in claim 2 wherein the porous inorganic membrane is selected from the group consisting of a porous ceramic membrane, a porous oxide membrane, a porous nitride membrane, a porous silicate membrane, and a porous carbide membrane.

5. The flexible membrane as defined in claim 1 wherein a thickness of the solid electrolyte coating ranges from about 10 nm to about 2 µm.

6. A method for coating a lithium battery component, the method comprising:

providing the lithium battery component, the lithium battery component being a porous membrane;
exposing the lithium battery component to a solvent including a solid electrolyte precursor;
exposing the solid electrolyte precursor to a treatment process that forms a solid electrolyte coating precursor on the lithium battery component; and
reacting or interacting the solid electrolyte coating precursor with polysulfide anions to form a solid electrolyte coating including a polymer chain saturated with oxygen anions or sulfur anions to enable diffusion of lithium cations and to suppress diffusion of polysulfide anions, wherein the polymer chain is selected from the group consisting of polydopamine, polythiophene, polypyrrole, polyaniline, polyacetylene, polyphenylacetylene, polydiacetylene, and derivatives thereof.

7. The method as defined, in claim 6 wherein the exposing of the lithium battery component to the solvent including the solid electrolyte precursor includes immersing the lithium battery component in the solvent including the solid electrolyte precursor or depositing the solvent including the solid electrolyte precursor on a surface of the lithium battery component.

8. The method as defined in claim 6 wherein the solid electrolyte precursor is a monomer and wherein the treatment process is polymerization.

9. A lithium sulfur battery, comprising:
a sulfur based positive electrode;
a negative electrode; and
a flexible membrane positioned between the sulfur based positive electrode and the negative electrode, the flexible membrane including:
a porous membrane; and
a solid electrolyte coating formed on at least a portion of a surface of the porous membrane, in pores of the porous membrane, or both on the surface and in the pores, the solid electrolyte coating including a polymer chain selected from the group consisting of polydopamine, polythiophene, polypyrrole, polyaniline, polyacetylene, polyphenylacetylene, polydiacetylene, and derivatives thereof, the polymer chain being saturated with oxygen anions or sulfur anions to enable diffusion of lithium cations, and to suppress diffusion of polysulfide anions.

* * * * *